United States Patent [19]

Yashiki et al.

[11] Patent Number: 5,027,609
[45] Date of Patent: Jul. 2, 1991

[54] ENGINE CONTROL SYSTEM

[75] Inventors: Seiji Yashiki, Hiroshima; Hiroshi Hirano, Hatsukaich; Toshio Takeda, Hiroshima, all of Japan

[73] Assignee: Mazda Motor Corporation, Hiroshima, Japan

[21] Appl. No.: 468,712

[22] Filed: Jan. 24, 1990

[30] Foreign Application Priority Data

Jan. 24, 1989 [JP] Japan ................................. 1-15973

[51] Int. Cl.$^5$ .............................................. B60H 1/32
[52] U.S. Cl. ...................................... 62/133; 62/230; 62/243; 62/323.4; 123/198 R
[58] Field of Search .............. 62/133, 208, 209, 228.1, 62/230, 239, 243, 244, 323.1, 323.4; 123/412, 380, 465, 198 R, 198 C

[56] References Cited

U.S. PATENT DOCUMENTS 4,619,286 10/1986 Caldwell .................... 123/465 X
4,823,555 4/1989 Ohkumo ...................... 62/243 X Primary Examiner—Harry B. Tanner
Attorney, Agent, or Firm—Fleit, Jacobson, Cohn, Price, Holman & Stern

[57] ABSTRACT

An engine control system of an automotive engine co-operates with an engine driven air conditioning system which is restrictively driven when the engine operates in a predetermined operating condition. The engine control system includes a pressure sensor to detect an atmospheric pressure at which the engine operates. The predetermined condition is changed according to the atmospheric pressure.

10 Claims, 3 Drawing Sheets

ENGINE CONTROL SYSTEM

FIELD OF THE INVENTION

The present invention relates to a control system for an automotive engine, and more particularly to an engine control system which restrictively operates complementary devices in cooperation with the automotive engine when the automotive engine is in a predetermined operating condition.

BACKGROUND OF THE INVENTION

One known type of engine control system for an automotive engine with an engine driven complementary device or system, such as an automotive air conditioning system including an air compressor releasably connected to the automotive engine by an electromagnetic clutch, forcibly actuates the electromagnetic clutch to disconnect the compressor from the automotive engine when an accelerator is overly depressed during acceleration to thereby decrease engine load so as to ensure the accelerative ability of the automotive engine. Such an engine control system is described in Japanese Patent Publication No. 59(1984) - 5445.

Meanwhile, when operating at high elevations, a fuel mixture delivered into the automotive engine tends to become overly rich in that the air becomes thinner and contains less oxygen to sustain burning. This results in a deterioration of the automotive engine acceleration ability. For this reason, when the automotive engine operating at high elevations is required to accelerate or rapid increase in speed, the accelerator is depressed frequently. In the automotive engine having the same type of engine control system as described above, the electromagnetic clutch is also actuated to frequently disconnect the compressor of the automotive air conditioning system from the automotive engine. Such a frequent operation of the accelerator causes hunting of the automotive engine due to changes in engine load.

Because the amount of air in the fuel mixture becomes thinner when the automotive vehicle operates at high elevations when compared to operating at low elevations, the automotive engine, for example in idling, loses speed and possibly stops due to an increase in engine load when the automotive air conditioning system operates while an oil pump is simultaneously actuated, for example, in driving a power steering unit.

SUMMARY OF THE INVENTION

It is, therefore, a primary object of the invention to provide an engine control system which performs the restriction or interruption of operation of an engine driven complementary system even when the automotive engine operates at high elevations where the air is thin so as to prevent the automotive engine from hunting and losing speed or stopping.

The above object of the present invention is achieved by providing an engine control system of an automotive engine which cooperates with an engine driven air conditioning system and which is restrictively driven or interrupted when the engine operates in a predetermined operating condition. The engine control system comprises a pressure sensor to detect an atmospheric pressure at which the engine operates and means for changing the predetermined operating condition according to the atmospheric pressure.

BRIEF DESCRIPTION OF THE DRAWINGS

The above and other objects and features of the present invention will be apparent from the following description of preferred embodiments thereof when taken in conjunction with the appended drawings, in which.

DETAILED DESCRIPTION OF THE PREFERRED EMBODIMENT

Figure 1:
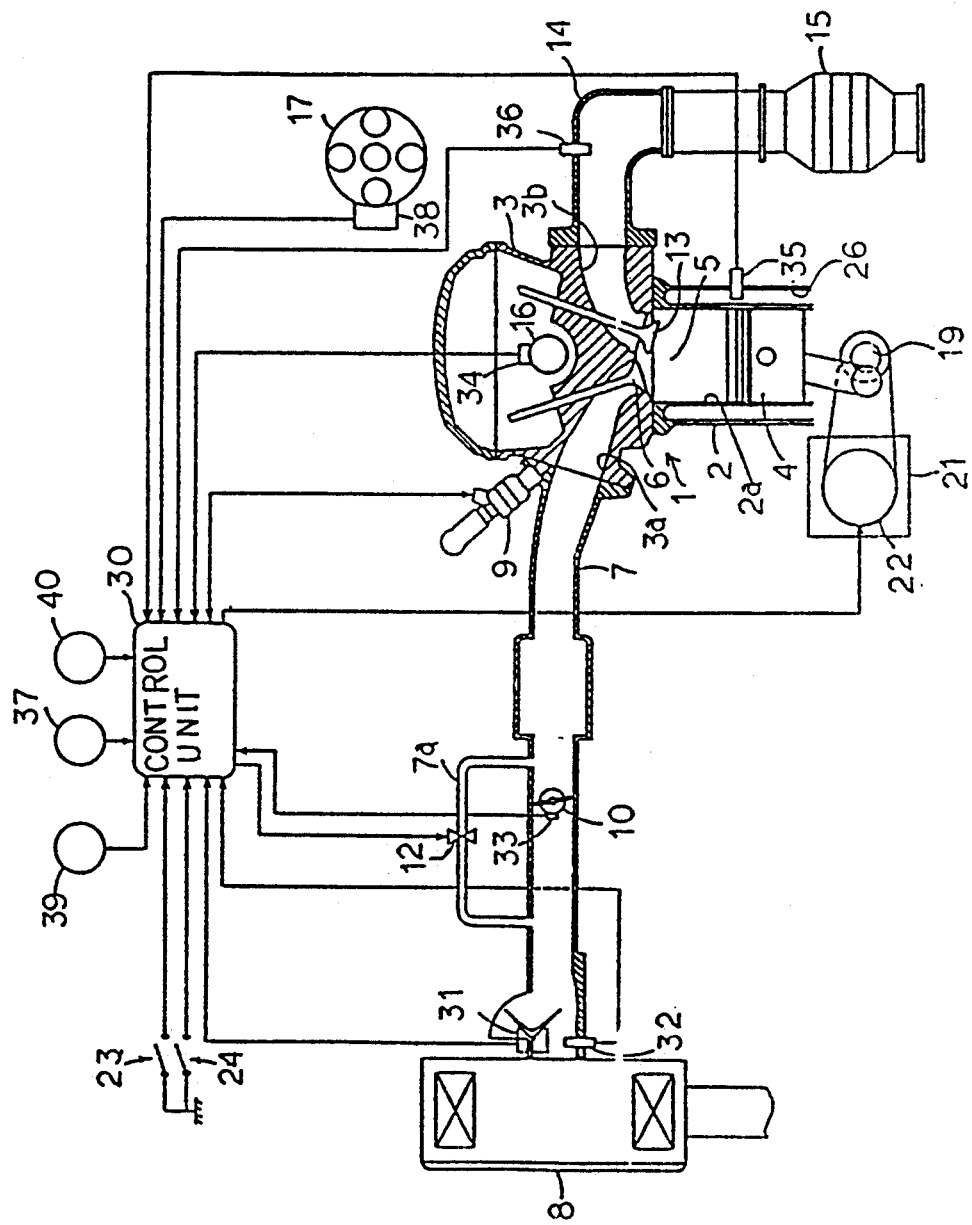
FIG. 1 is a schematic diagram illustrating an automotive engine cooperating with an engine control system in accordance with a preferred embodiment of the present invention.

Referring to the drawings in detail, particularly to FIG. 1, an engine body 1 of an internal combustion engine in cooperation with an engine control system in accordance with a preferred embodiment of the present invention is shown, comprising a cylinder block 2 and a cylinder head 3 mounted on the cylinder block 2. The cylinder block 2 is formed with a row of cylinders 2a in each of which a piston 4 snugly fits and moves. The cylinder head 3 forms a combustion chamber 5 in the cylinder 2a in cooperation with the piston 4.

The cylinder head 3 is formed with an intake passage 3a opening at an end to an intake port of the combustion chamber 5 in the cylinder 2a, which intake port is timely opened and closed by means of an intake valve 6. The intake passage 3a is connected at the other end thereof to an intake pipe 7 opening to the atmosphere through an air cleaner 8. The intake pipe 7 is provided with a fuel injection nozzle 9 arranged close to the intake passage 3a of the cylinder head 3 for delivering a controlled amount of fuel into the automotive engine. The intake pipe 7 is further provided with a throttle valve 10 for controlling the amount of intake air to be mixed with an amount of fuel controlled by the fuel injection nozzle 9. The throttle valve 10 is located between the air cleaner 8 and fuel injection nozzle 9. The intake pipe 7 has a bypass pipe 7a having an ISG valve 12 for allowing intake air partly to bypass the throttle valve 10.

The cylinder head 3 is further provided with an exhaust passage 3b opening at an end to an exhaust port of the combustion chamber 5, which exhaust port is timely opened and closed by means of an exhaust valve 13. The exhaust passage 3b is connected at the other end thereof to an exhaust pipe 14 opening to the atmosphere through a catalytic converter 15 for significantly lowering emission levels of hydrocarbons, carbon monoxide, and in the case of some converters, oxides of nitrogen in the exhaust from the automotive engine.

Both the intake valve 6 and exhaust valve 13 are timely driven to open and close the intake port and exhaust port by means of cams on an engine camshaft 16. A distributor 17 is provided in association with ignition plugs to make and break the ignition primary circuit and to distribute resultant high voltage to the proper cylinder at a correct time.

The internal combustion engine is cooperates with various supplementary systems or devices, such as an air conditioning system, a power steering system, an alternator or the like, which are all driven or actuated by the automotive engine. In FIG. 1, there is shown a pump 21 of, for example, an automotive air conditioning system. The pump 21 is operationally coupled to an output shaft 19 by means of an electromagnetic clutch 22 so as to be connected to and disconnected from the output shaft 19. Switches 23 and 24 are turned on by a driver to operate the automotive air conditioning system and the power steering system, respectively. These switches 23 and 24 are connected to a control unit 30 mainly comprising a microcomputer which is a part of the engine control system controlling the fuel injection nozzle 9, ICS valve 12 and electromagnetic clutch 22.

The engine control system cooperates with various sensors, such as an air flow meter or sensor 31, temperature sensors 32 and 35, a throttle opening sensor 33, a crank angle sensor 34, an oxygen sensor 36, an engine speed sensor 37 and a pressure sensor 38, and switches 39 and 40. The air flow sensor 31 and temperature sensor 32, both disposed upstream of the throttle valve 10 in the intake passage 7 to detect an amount and temperature, respectively, of intake air introduced into the intake pipe 7 through the air cleaner 8. The throttle opening sensor 33 in cooperation with the throttle valve 10 detects the opening of the throttle valve 10. The crank angle detector 34 is operationally connected to the crankshaft 16 to detect a rotated crank angle of the camshaft 16 of the internal combustion engine. The other temperature sensor 35, namely a coolant temperature sensor, is provided in a coolant passage formed in a wall of the cylinder block 2 to detect the temperature of a coolant flowing in the coolant passage 2b. The oxygen sensor, 36 is disposed in the exhaust pipe 14 to detect the content of oxygen in the exhaust from the automotive engine. The engine speed sensor 38 cooperates with the distributor 17 to detect the speed of rotation of the engine. The pressure sensor 37 is provided to detect atmospheric pressure. The idle switch 39 and neutral switch 40 are provided to detect the engine in idle and the transmission in neutral, respectively. Outputs from these sensors 31–38 and switches 39 and 40 are connected to the control unit 30. All these sensors 31–38 per se are well known in structure and operation.

Figure 2:
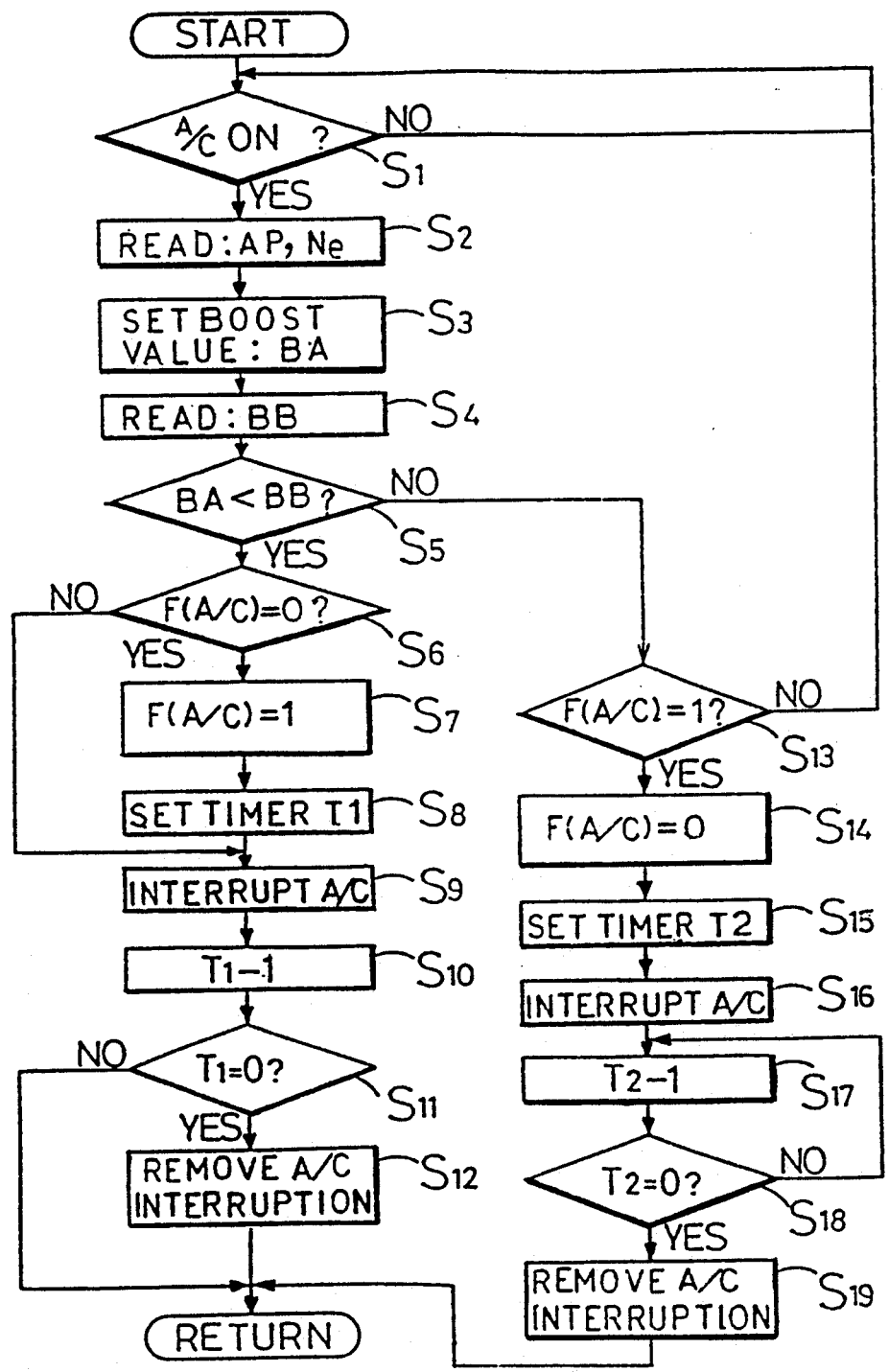
FIG. 2 is a flow chart illustrating an air conditioning interruption.

FIG. 2 is a flow chart of the controlling of the electromagnetic clutch 22 for a microcomputer of the control unit 30 of the engine control unit. The first step S1 is to decide whether or not the automotive air conditioning system (A/C) is actuated according to the output from the switch 23. If the answer to the decision is yes indicating the automotive air conditioning system (A/C) is on, then, outputs of the pressure sensor 37 and engine speed sensor 38 are read to determine the atmospheric pressure (AP) and engine speed (Ne) in step S2. According to the atmospheric pressure (AP) and engine speed (Ne) thus determined, a boost value which is the value of negative pressure (BA) is set to define an air conditioning interruption (A/C CUT) zone where the automotive air conditioning system (A/C) is disabled from operation while the air conditioning switch 23 is turned on. The air conditioning interruption (A/C) zone is so established that the boost value (BA) becomes smaller when the accelerator is depressed for acceleration. The boost value is predetermined to be smaller as atmospheric pressure becomes lower such as, for example, −150 mmHg for an atmospheric pressure of 760 mmHg; −140 mmHg for an atmospheric pressure of 750 mmHg; or −130 mmHg for an atmospheric pressure of 740 mmHg. As apparent from this example, the air conditioning interruption (A/C CUT) zone shifts toward a high load-high speed side and becomes narrower as atmospheric pressure becomes lower.

After reading an actual boost value (BB) in step S4, the actual boost value (BB) is compared to the set boost value (BA) in step S5 in order to decide whether or not the engine operating condition of the automotive engine is in the air conditioning interruption (A/C CUT) zone. If the boost value (BA) is smaller than the actual boost value (BB) indicating the automotive engine is in the air conditioning interruption (A/C CUT) zone in operating condition and therefore required for acceleration, a decision is made in step S6: "is an air conditioning cut flag F(A/C) set to zero ?" Because the air conditioning interruption flag F(A/C) is initially set to zero, after setting the air conditioning interruption flag F(A/C) to one (1) in step S7, a count down set timer T1 is set to a predetermined count value.

If the answer to the decision in step S6 indicates that no air conditioning interruption flag F(A/C) has been set to one (1), then, steps S7 and S8 are skipped and steps S9–S11 are taken to perform air conditioning interruption, causing the count down timer T1 to count down by one (1). After repeating steps S1–S11, if the count down set timer T1 counts down to zero (0) and the answer to the decision in step S11 becomes yes, the electromagnetic clutch 22 is actuated to connect the pump 21 of the automotive air conditioning system (A/C) to the output shaft 19 of the automotive engine, thereby air conditioning interruption is removed or air conditioning is restarted in step S12. The final step S12 orders return.

On the other hand, if the answer to the decision in step S5 regarding the boost values is no indicating that the actual boost value (BB) is equal to or smaller than the set boost value (BA), and hence, that the automotive engine is neither in the air conditioning interruption (A/C CUT) zone nor required acceleration, steps S13–S19 follow without directly performing an air conditioning interruption. That is, a decision is made in step S13 to judge whether or not the air conditioning interruption flag F(A/C) has previously been set to one (1). If the air conditioning interruption flag F(A/C) has been set to zero (0), then, the first step S1 is called for. On the other hand, if the answer to the decision in step S13 is yes, indicating that the automotive engine in its operating condition has just escaped from the air conditioning interruption (A/C CUT) zone, then the air conditioning interruption flag F(A/C) is set to zero (0) in step S14 and a count down set timer T2 is set to a predetermined count value in step S15. After the preparatory operation, the electromagnetic clutch 22 is actuated to disconnect the pump 21 of the automotive air conditioning system (A/C) from the output shaft 19 of the automotive engine, thereby performing air conditioning interruption in step S16. Whenever, there is the performing of air conditioning interruption in step S16, the count down timer T2 counts down by one (1) in step S17. Thereafter, a decision is made in step S18: "has the count down timer T2 counted down to zero (0) ?" If the answer to the decision is no, step S17 is repeated until the count down counter has counted down to zero (0). If the count down timer T2 counts down to zero (0) and the answer to the decision in step S18 becomes yes, the electromagnetic clutch 22 is actuated to connect the pump 21 of the automotive air conditioning system (A/C) to the output shaft 19 of the automotive engine, thereby restarting air conditioning in step S19. The final step S19 orders return. Accordingly, the automotive engine is free from load due to the automotive air conditioning system for the predetermined time defined by the timer T1 or T2, so as to contribute to the acceleration ability thereof.

As was previously described, if removing air conditioning interruption when the actual boost value BB becomes smaller than the set boost value BA and the automotive engine in its operating condition escapes from the air conditioning interruption (A/C CUT) zone during the performing of air conditioning interruption or the timer T1 has not counted down to zero, shocks, which are caused due to the restarting of air conditioning and the deceleration of the automotive engine, are large and not negligible. According to the engine control system of the present invention described above, however, no shocks due to the restarting of air conditioning is caused since air conditioning is continuously disabled for a time defined by the count down set timer T2 after the automotive engine in its operating condition has escaped from the air conditioning interruption (A/C CUT) zone, thereby shocks in the automotive engine are suppressed.

As is apparent from the above description in connection with a preferred embodiment of the invention, since the air conditioning interruption (A/C CUT) zone shifts toward a high engine load-high engine speed side as the atmospheric pressure detected by the pressure sensor becomes higher and becomes narrower as the atmospheric pressure becomes lower. The air conditioning system is operated at low frequencies of air conditioning interruption even when the accelerator is frequently depressed for acceleration when the automotive engine operates at high elevations. This results in an increase of engine load and the prevention of hunting of the automotive engine.

Figure 4:
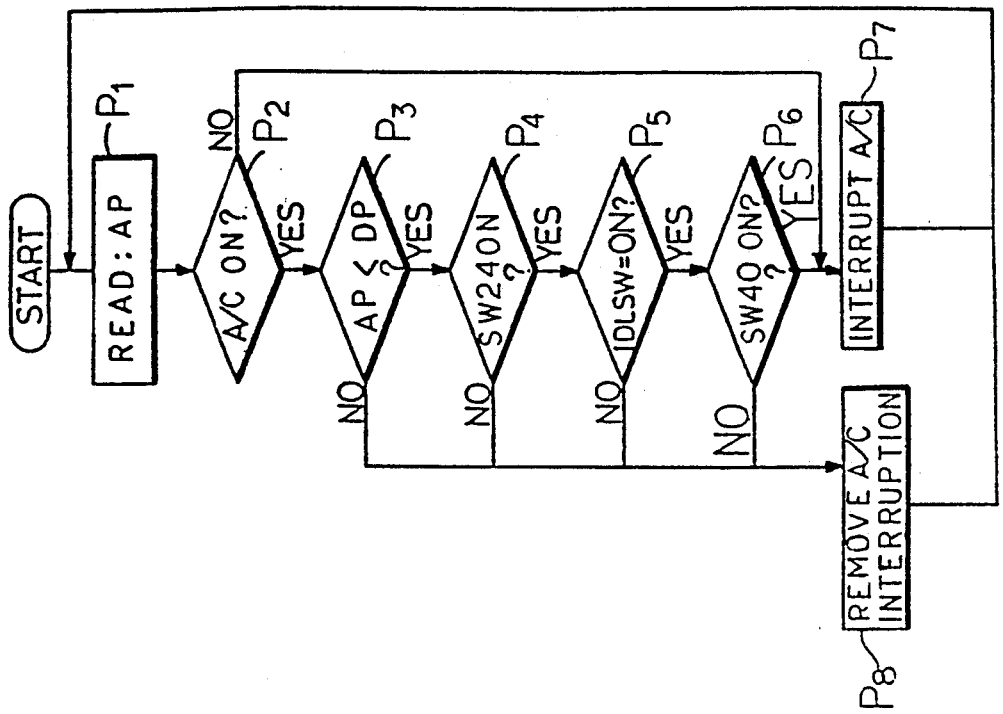
FIG. 4 is a flow chart illustrating an air conditioning interruption according to another preferred embodiment of the present invention.
Figure 3:
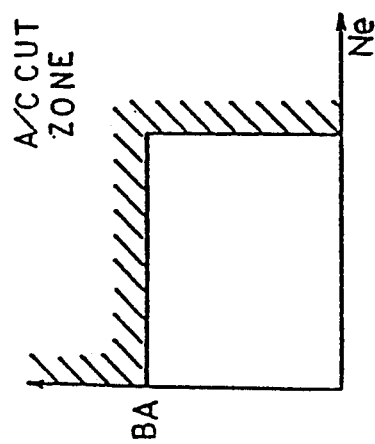
FIG. 3 is an explanatory illustration of an air conditioning interruption zone.

Referring to FIG. 4 which is a flow chart illustrating the controlling of the electromagnetic clutch 22 for a microcomputer of the control unit 30 of an engine control unit of an engine control system according to another preferred embodiment of the invention, the first step P1 is to read an output of the pressure sensor 37 to determine the atmospheric pressure (AP). Then, the condition of the switch 23 is read and a decision is made whether or not the automotive air conditioning system (A/C) is actuated in step P2. If the answer to the decision is no indicating the air conditioning system is not operated, after immediately actuating the electromagnetic clutch 22 so as to disconnect the pump 21 from the output shaft 19 of the automotive engine, thereby interrupting the air conditioning system in step P7, step P1 is taken again. If, on the other hand, the answer to the decision is yes indicating the automotive air conditioning system (A/C) is on, then, the atmospheric pressure (AP) is compared to a predetermined pressure (DP) in step P3.

If the answer to the decision in step P3 is no, indicating that the atmospheric pressure (AP) is lower than the predetermined pressure (DP), then since the automotive engine is not much lowered in output power and, therefore, does not slow down in speed even if the air conditioning system is still on, step P8 is encountered and after removing the interruption of the air conditioning in step P8, step P1 is taken again. If, on the other hand, the answer to the decision in step P3 is yes indicating that the atmospheric pressure (AP) is equal to or higher than the predetermined pressure (DP), a decision is made based on the condition of the switch 24 in step P4: "is the power steering system on ?"

If the power steering system is off or the answer to the decision is no, then, since the air conditioning system itself does not cause the automotive engine to slow down in speed, after removing the interruption of the air conditioning in step P8, step P1 is taken back. If, on the other hand, the answer to the decision in step P4 is yes indicating the power steering system is on, then, decisions are made in order to decide whether or not the idle switch 39 is on in step P5 and whether the transmission switch 40 is on in step P6. If either the idle switch 39 is off or if the transmission switch 40 is off, since the automotive engine does not slow down in speed even if the automotive air conditioning system is on, after removing the interruption of air conditioning in step P8, step P1 is taken back. If, on the other hand, both the idle switch 39 and transmission switch 40 are on, since the air conditioning system and power steering system exert a large load on the automotive engine, the air conditioning system is interrupted in step P7 and then step P1 is taken back.

As apparent from the above description in connection with the another preferred embodiment of the invention, since the air conditioning system is forcibly interrupted when the power steering system is effective during idling under low atmospheric pressures, the automotive engine is prevented from losing speed at high elevations.

What is claimed is:

1. An engine control system for an automotive engine, cooperating with an engine driven supplemental system of an automotive vehicle for driving the engine driven supplemental system, comprising:

pressure detecting means for detecting an atmospheric pressure at which the automotive engine is operating;

an engine speed sensor for detecting a speed at which said engine operates;

boost value determining means for determining an actual boost value, representing an actual negative intake pressure, during operation of said engine; and supplemental system operating means for operating said engine driven supplemental system only when the speed at which said engine operates is less than a predetermined speed and the actual boost value is less than a predetermined boost value, said predetermined boost value becoming smaller as the atmospheric pressure detected by said pressure detecting means decreases.

2. An engine control system as defined in claim 1, wherein said engine driven supplemental system is an automotive air conditioning system having a pump operationally connected to the automotive engine.

3. An engine control system as defined in claim 2, wherein said pump is disconnected from an output shaft of the automotive engine by means of an electromagnetic clutch which operationally disconnects the pump from the output shaft of the automotive engine when the supplemental system operating means does not operate the automotive air conditioning system.

4. An engine control system for an automotive engine, cooperating with a plurality of engine driven supplemental systems of an automotive vehicle for driving one of the plurality of engine driven supplemental systems, comprising:

pressure detecting means for detecting an atmospheric pressure at which the automotive engine is operating;

an engine speed sensor for detecting a speed at which said engine operates;

boost value determining means for determining an actual boost value, representing an actual negative intake pressure, during operation of said engine; and supplemental system operating means for operating said engine driven supplemental system only when the speed at which said engine operates is less than a predetermined speed and the actual boost value is less than a predetermined boost value, said predetermined boost value becoming smaller as the atmospheric detected by said pressure detecting means decreases.

5. An engine control system as defined in claim 4, wherein said one of the plurality of engine driven supplemental systems is an automotive air conditioning system having a pump operationally connected to the automotive engine and the other is a power steering system having a pump operationally connected to the automotive engine.

6. An engine control system for an automotive engine, cooperating with an engine driven supplemental system of an automotive vehicle for driving the engine driven supplemental system comprising:

pressure detecting means for detecting an atmospheric pressure at which the automotive engine is operating;

power steering detecting means for determining if a power steering system is operating;

idle detecting means for determining if said engine is idling;

transmission condition detecting means for determining if the vehicle is in gear; and supplemental system operating means for operating said engine driven supplemental system, said supplemental system operating means interrupting operation of said supplemental system only when said power steering system is operating, said engine is idling, said vehicle is in gear, and said atmospheric pressure is lower than a predetermined pressure.

7. An engine control system as defined in claim 6, wherein said engine driven supplemental system is an automotive air conditioning system having a pump operationally connected to the automotive engine.

8. An engine control system as defined in claim 7, wherein said pump is disconnected from an output shaft of the automotive engine by means of an electromagnetic clutch which operationally disconnects the pump from the output shaft of the automotive engine when the supplemental system operating means does not operate the air conditioning system.

9. An engine control system for an automotive engine, cooperating with a plurality of engine driven supplemental systems of an automotive vehicle for driving one of the plurality of engine driven supplemental systems, comprising:

pressure detecting means for detecting an atmospheric pressure at which the automotive engine is operating;

power steering detecting means for determining if a power steering system is operating;

idle detecting means for determining if said engine is idling;

transmission condition detecting means for determining if the vehicle is in gear; and supplemental system operating means for operating said engine driven supplemental system, said supplemental system operating means interrupting operation of said supplemental system only when said power steering is operating, said engine is idling, said vehicle is in gear, and said atmospheric pressure is lower than a predetermined pressure.

10. An engine control system as defined in claim 9, wherein said one of the plurality of engine driven supplemental systems is an automotive air conditioning system having a pump operationally connected to the automotive engine and the other is a power steering system having a pump operationally connected to the automotive engine.

* * * * *